Jan. 16, 1934.  E. P. LARSH ET AL  1,944,011

INERTIA GOVERNOR FOR ROTATING BODIES

Filed March 30, 1931   2 Sheets-Sheet 1

Inventor
Everett P. Larsh
Emil J. Peterhans
By J. L. Walker
Attorney

Patented Jan. 16, 1934

1,944,011

UNITED STATES PATENT OFFICE 1,944,011

INERTIA GOVERNOR FOR ROTATING BODIES

Everett P. Larsh, Vandalia, and Emil J. Peterhans, Dayton, Ohio, assignors to The Master Electric Co., Dayton, Ohio, a corporation of Ohio Application March 30, 1931. Serial No. 526,436

24 Claims. (Cl. 172—275)

This invention relates to synchronous motors and more particularly to an inertia governing means for imparting to a rotating body an auxiliary rotative influence upon retardation of its speed of rotation.

The object of the invention is to simplify the construction as well as the means and mode of operation of synchronous motors whereby they will not only be cheapened in construction, but will be more efficient in operation, uniform in action, accurate and reliable, automatically controlled and unlikely to get out of repair.

An important object of the invention is to provide an improved form of inertia member set in motion by the rotation of the rotor, which is initially rotated at a speed greater than its synchronous operating speed, which thereafter when the rotor has fallen into phase with the current cycles, imparts to the rotor sufficient actuating influence to carry the rotor over balanced or dead center position between successive electrical impulses.

A further object of the invention is the utilization of gravity for imparting to the rotor actuating impulses alternately with the electrical impulses, and supplemental thereto.

With the above primary and other incidental objects in view as will more fully and clearly appear in the specification, the invention consists of the features of construction, the parts and combinations thereof, and their mode of operation, or their equivalents, as hereinafter described and set forth in the claims.

Figure 1:
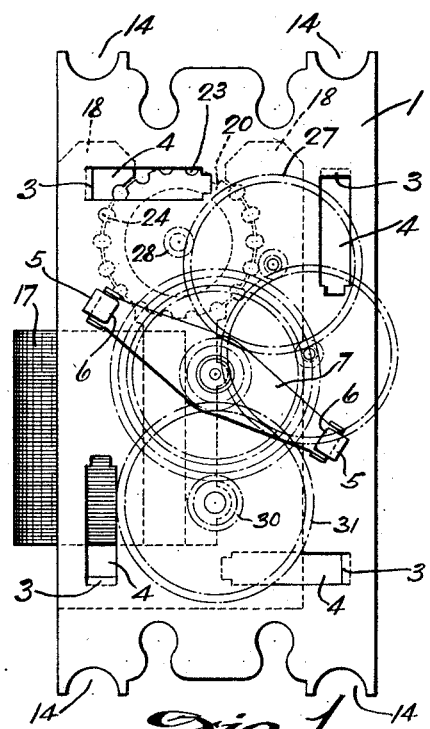
Figure 2:
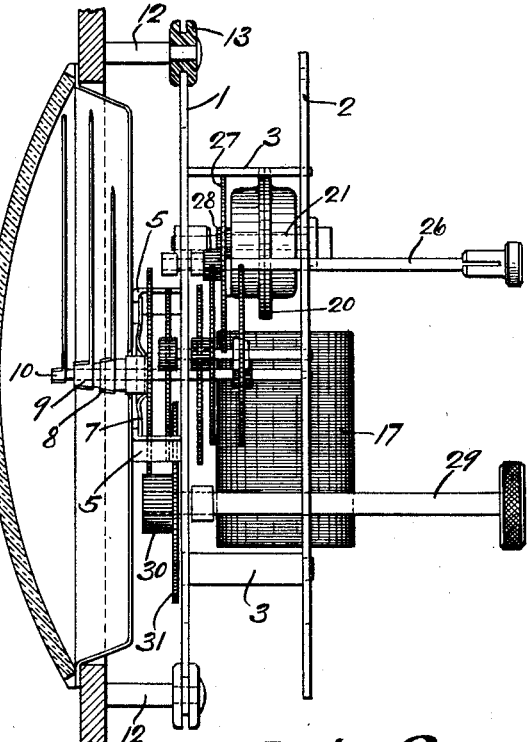
Figure 4:
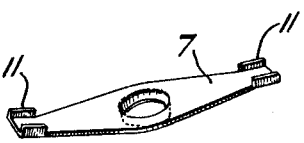
Figure 3:
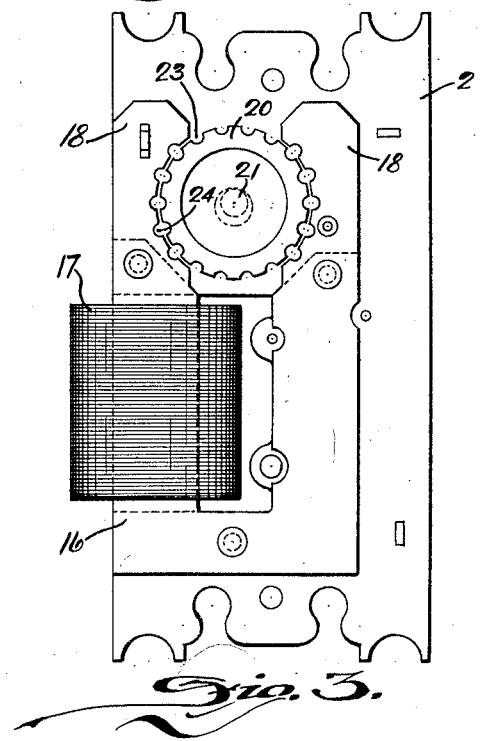
Figure 7:
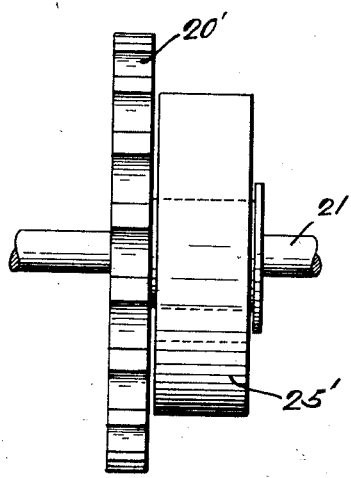
Figure 8:
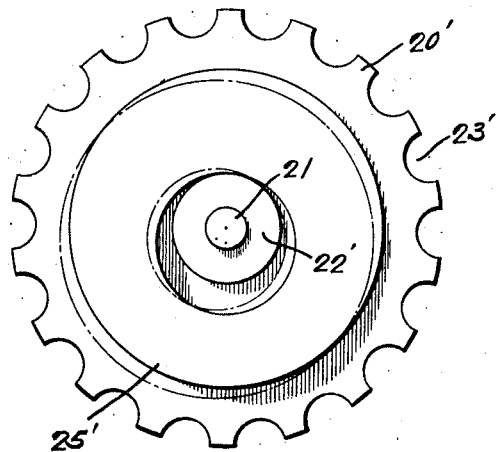
Figure 5:
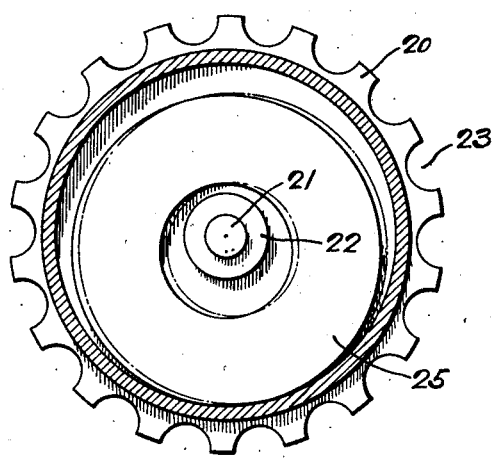
Figure 6:
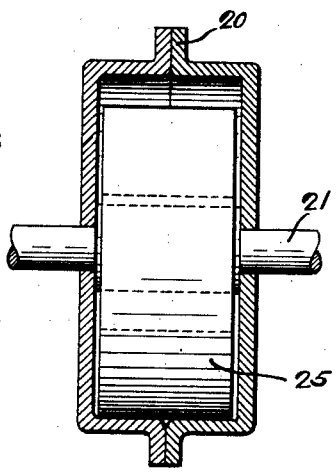

Referring to the accompanying drawings wherein is shown the preferred but obviously not necessarily the only form of embodiment of the invention, Fig. 1 is a front elevation of a clock mechanism to which the present invention is applied. Fig. 2 is a side elevation thereof. Fig. 3 is a detail view of the synchronous motor viewed from the inner side of the rear frame member to which the stator or field element is attached. Fig. 4 is a detail perspective view of the spring bridge for the concentric gear assembly upon the front of the clock frame for driving the clock hands. Fig. 5 is an enlarged sectional view of the rotor and inertia device illustrating by dotted lines the relative movement of the latter in imparting the gravity actuating impulse. Fig. 6 is a detail sectional view at right angles to that shown in Fig. 5. Figs. 7 and 8 are side elevations at right angles to each other of a modification of the application of the inertia weight to the rotary member.

Like parts are indicated by similar characters of reference throughout the several views.

The use of a synchronous motor for driving a clock mechanism wherein the cycle frequency of an alternating electric current is utilized for timing the motor operation is quite well known. Such synchronous motors are ordinarily not self-starting but must be set in operation by manual effort. This is effected by initially whirling the rotor at a speed greater than its synchronous speed and as the rotation gradually decreases it falls into phase or step with the cycle frequency of the actuating current and thereafter receives successive actuating impulses as successive segments of the rotor enter into the magnetic field of the stator or electro-magnet which forms a part of the motor. If left entirely to the influence of the electrical impulses the rotor would eventually assume a balanced position between the pole pieces of the stator and come to rest. To automatically carry the rotor over such balanced or dead position between successive electrical impulses an inertia member is provided to impart to the rotor a momentary actuating impulse sufficient to advance the rotor to a position where the electrical effect of the field or stator will again be effective.

Heretofore such auxiliary impulse imparting device has usually been a spring, a friction element which when set in motion draws the motor along with it by its frictional coupling or by means of a body of liquid contained in the rotor and exerting a frictional driving contact therewith by which the rotor is carried along with the rotating liquid body.

In the present instance there is utilized an inertia weight which, while the rotor is traveling normally under influence of the electrical impulses, assumes a substantially balanced relation to the rotor during which time the movement of the rotor is imparted to the inertia weight. However upon retardation of the rotor movement as momentarily occurs to a slight extent between succeeding electrical impulses, the momentum of the inertia weight causes it to shift its position slightly relative to the rotor whereby the center of gravity of the weight is moved to a slight degree laterally out of dead center relation with the center of rotation, and the rotor receiving the gravity influence of the weight in such unbalanced relation tends to swing about its axis of rotation under such gravity influence to bring the weight back to its normal balanced position and in so doing the succeeding segments of the weight are brought into the magnetic field where they receive an actuating electrical impulse sufficient to carry the rotor through a succeeding step in its rotation whereupon the cycle of operation is repeated. Thus the inertia weight acting through gravity to impart an advanced impulse to the rotor alternates with the electrical impulses imparted thereto through the magnetic field of the stator or magnet of the motor. For convenience of illustration but without intending to limit the embodiment of the invention to specific form, the inertia weight is shown herein and described as a roller weight disposed eccentrically with the rotor and having either rolling contact upon the interior of the peripheral wall of the rotor, in which case the roller weight has no engagement with the shaft or hub of the rotor, or the roller weight which is provided with a central enlarged opening through which the hub or shaft of the rotor extends has interior rolling contact upon the periphery of the rotor's hub or shaft, in which case it does not have contact with the peripheral wall of the rotor. In both forms of construction the roller weight is eccentrically disposed relative to the rotor and is entirely free for shifting movement relative thereto and in neither instance is there any frictional coupling, viscous connection or liquid seal between the sides of the inertia roller weight and the side walls of the rotor.

Referring to the accompanying drawings, 1 and 2 indicate respectively the front and rear frame plates upon which the clock mechanism is supported, these plates being fixedly held in spaced relation by intermediate tie arms 3. Projecting from the front plate 1 are spaced arms 5—5, the inturned ends 6 of which are detachably engaged by the extremities of a spring bridge bar 7 which stands and holds in assembly the final gears of the clock work frame.

The indicator or hand shafts 8, 9 and 10 are driven in properly timed relation by a suitable gear train which per se forms no part of the present invention. This gear train is actuated in proper time by a synchronous motor which consists of a laminated U shaped core 16 secured to the rear frame plate 2 and having about one leg thereof the coil or winding 17 which is connected with a commercial electrical power line. Such commercial electric power is ordinarily supplied as sixty cycles current, that is alternating current having a frequency of alternation or reversal of sixty times per second. However the synchronous motor and gear train herein illustrated may be adapted for operation with electric current of any other cycle frequency.

Attached to and extending beyond the legs of the core or stator 16 are pole pieces 18, the inner margins of which are of arcuate concentric formation agreeing with the peripheral margin of a rotor 20 mounted upon a shaft 21 intermediate the pole pieces and having bearings which are preferably of the oilless or composition type, in the front and rear frame plates 1 and 2. The rotor 20 is of hollow construction and is preferably though not necessarily formed in two halves marginally joined to each other. The rotor is provided with a marginal flange indented at regularly spaced intervals to form a succession of radially disposed segments 23. The segment flange of the rotor 20 lies in a plane common with the pole pieces 18 of the stator with the marginal faces of the rotor and of the pole pieces closely disposed in parallel or concentric relation. The concave faces of the pole pieces are also notched or indented at spaced intervals to form a succession of tooth like projections or segments 24 so disposed as to register throughout with the segments 23 of the rotor 20. As the rotor 20 turns in the bearing of its shaft 21, the succeeding segments 23 of the rotor are attracted by the magnetic influence of the segments 24 of the pole pieces, each impulse serving to advance the segments 23 of the rotor into close or registering relation with the succeeding segments 24 of the pole pieces. The current and hence the magnetic influence is intermittent. During such momentary intervals between impulses the rotor must advance to bring each succeeding segment 23 into the field of influence of succeeding pole segments 24. Such movement is to some extent effected by momentum of the rotor and any fly wheel effect possessed thereby, but such momentum is insufficient to afford the degree of rotary motion necessary to bring the several rotor segments progressively into the fields of influence of the pole segments. It is therefore necessary to provide some inertia element which will assist the rotor past the critical point during the "dead" interval between successive electrical impulses.

In the present instance this inertia element comprises a roller weight 25 eccentrically positioned within the hollow rotor 20 and resting upon the interior bottom of the peripheral wall of the rotor. This roller weight has a central opening sufficiently large to clear the hub 22 and shaft 21 of the rotor in every position which the roller weight may assume. Normally, that is when the rotor is at rest and also when the rotor is turning under the influence of magnetic impulses, the roller weight 25 occupies a balanced position as shown in Fig. 5 with its center of gravity substantially in vertical alignment with the center of rotation of the rotor. The roller weight 25 has rolling contact upon the interior peripheral wall of the rotor and during the movement of the rotor under excessive electrical impulses, the rotary motion of the rotor is transmitted to the roller weight 25, the weight and rotor turning in unison in the same direction. Thus the roller weight acquires a degree of momentum sufficient to continue the roller weight in rolling motion after the rotor 20 has been retarded. As the rotor 20 hesitates in its somewhat step by step movement under influence of the intermittent electrical impulses the roller weight 25 possesses a tendency to shift its position relative to the rotor by rolling upon the peripheral wall thereof in a direction reversely to the direction of rotation of the rotor 20. This shifting movement of the roller weight 25 upon retardation or momentarily stopping of the rotor is illustrated by dotted lines in Fig. 5. Such shifting movement changes the center of gravity of the roller weight 25 out of balanced relation with the axis of rotation, causing the gravity influence of the weight to be received upon the periphery of the rotor 20 slightly to the rear (relative to the direction of rotation of the rotor) of the center of rotation and thereby throws the rotor slightly out of balance. The slight movement or impulse of the rotor under influence of gravity necessary to bring the weight 25 back to its normal balanced position relative to the center of operation is sufficient to advance succeeding rotor segments 23 into the field of magnetic influence of succeeding pole segments 24 and they are attracted thereby thus imparting to the rotor another forward impulse. The gravity impulses of the shifting roller weight 25, and the electrical impulses through the field magnet of the motor are effected alternately and, of course, in a very rapid succession thus keeping the rotor 20 in constant movement. The electrical impulses being quite accurately timed, that is the frequency of the energizing current being substantially constant, the rotor 20 will be driven at a uniform rate of speed. While the frequency of the alternating power current may vary slightly from second to second of time falling to fifty-eight alternations one second and increasing to sixty-two another second over a period of some seconds or a minute or greater period of time the average will be uniformly and accurately sixty cycles per second. Thus a clock of this type is operated very accurately. It requires no winding and no attention other than restarting and necessary resetting, in the event that the current supply is interrupted.

In order to start the motor it is necessary to rotate it at a speed approximating that of its synchronous speed until it falls into step or in phase with the current cycles or alternation. The usual method is to rotate the rotor 20 at a speed somewhat in excess of its synchronous speed, allowing the speed to gradually decrease until it falls under the influence of the electrical impulses.

In the present construction there is provided a rotary spindle 26 projecting from the rear of the clock frame for manual actuation. This spindle 26 carries a gear 27 meshing with a gear pinion 28 upon the rotor shaft which transmits the rotation of the spindle 26 to the rotor at an increased rate of speed. This rotation is transmitted to the roller weight 25 within the hollow rotor 20 which has traction on the interior peripheral wall of the rotor. During the manual operation the rotor is the driving element and the roller weight 25 the driven element. The roller weight acquires sufficient momentum that after the release of the shaft 26 the continued rotation of the roller weight is sufficient to drive the rotor at a slowly decreasing rate of speed, until the synchronous speed is approached whereupon the rotor falls under influence of the electrical impulses and the cycle of operation heretofore described is initiated. The gear pinion 28 and gear 27 are the initial members of the clock work gear train by which the timed motion is transmitted to the hand shafts 8, 9 and 10 at proper relative rates of rotation. The manually rotatable shaft 29 is provided in the lower portion of the frame and carries the gear elements 30 and 31 meshing with the minute shaft gear and the hour shaft gear respectively to effect the resetting of the clock hands as may be necessary. The gear train is provided with the usual slip or friction drive connection which permits the resetting of the minute and hour shafts and their connected gear elements independently of the movement of the remainder of the gear train.

While the hollow rotor with the roller weight enclosed therein and having traveling engagement with the peripheral wall of the rotor is the preferred construction, there is shown in Figs. 7 and 8 a modification wherein the rotor 20' consists of a flat circular peripherally notched plate having a laterally extending hub 22' upon which is suspended in eccentric relation with the rotor 20' an annular inertia weight member 25'. The inertia member 25' has a central opening considerably larger than the diameter of the hub 22' upon which the annular inertia member is suspended. Normally the inertia member is suspended in balanced relation upon the top side of the hub 22' with its contact point in vertical alignment with the center of rotation and with its center of gravity also in vertical alignment with the axis of rotation. As the rotor 20 revolves the annular inertia weight 25' has sufficient traction engagement with the hub 22' to receive a unison rotary motion in the same direction as the rotation of the rotor. The annular inertia weight 25' will assume this balanced relation when the rotor is at rest and during the rotation of the rotor in starting and when under the influence of the intermittent electrical impulses. The annular weight acquires sufficient momentum during the rotation of the rotor to tend to continue the rotary motion of the annular inertia weight after the rotor has been retarded. Upon hesitation or retardation of the rotor 20' the momentum of the annular inertia weight 25' will cause the latter to swing forwardly in the direction of rotation of the rotor with a somewhat pendulum like movement. This swinging or pendulum movement of the suspended annular inertia weight, not only imparts to the rotor an impulse due to such swinging motion but it also changes the suspension point or point of bearing contact between the annulus and the hub 22 from a balanced position immediately above the center of rotation to one slightly rearwardly thereof so that the gravity influence of the weight of the annulus is imparted to the hub 22 in slightly offset or unbalanced position. Such shifting of the suspended annulus is sufficient to overbalance the rotor 20' and give to the rotor the required impulse necessary to bring it into the succeeding field of magnetic attraction. The annulus 25' is supported upon the hub 22 in parallel relation with the rotor 20' preferably out of contact with the lateral face of the rotor and is retained upon the hub by any suitable retaining flange or collar sufficient to prevent lateral displacement of the annular weight.

While the normal position of operation is with the rotor 20 in a vertical plane of rotation, it has been found in practice that the present motor will operate in a horizontal position, that is with the rotor 20, rotating in a horizontal plane about a vertical axis. This is thought to be due to the slight eccentric relation of the inertia weight which although throwing the rotor slightly out of balance or rendering it slightly heavier at one side of its axis than at the other, this unbalanced condition is uniformly effective throughout the entire circle of rotation and the rotor acquires sufficient momentum to carry it over the critical point between the successive fields of magnetic influence intermediate actuating pulsations.

While the inertia governor, forming the subject matter hereof, has been herein illustrated and described in its application to an electric clock motor for which purpose the construction is peculiarly suited, it is to be understood that the invention is not limited to clock constructions alone, but may be applied to other purposes and likewise may be applied to motors of larger size. It is therefore to be understood that the present embodiment in a clock construction is for illustrative purposes only and with no intent to limit the scope nor application of the invention.

From the above description it will be apparent that there is thus provided a device of the character described possessing the particular features of advantage before enumerated as desirable, but which obviously is susceptible of modification in its forms, porportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

Having thus described our invention, we claim:

1. An alternating current synchronous motor including a field magnet and a rotor subjected to successive magnetic impulses of the field magnet, a roller weight eccentrically positioned relative to the rotor and having rolling contact upon a portion thereof, said roller weight being free to change its position relative to the rotor and normally assuming a balanced position in relation with the center of rotation of the rotor, in which position the rotary motion of the rotor is transmitted to the roller weight, and out of which balanced relation the roller weight shifts upon retardation of the rotor thereby effecting an unbalanced condition, the effect of which is to impart to the rotor an advance movement.

2. An alternating current synchronous motor including a field magnet and a rotor subjected to successive magnetic impulses of the field magnet, a roller weight eccentrically positioned relative to the rotor having rolling contact with an interior annular surface of the rotor and normally rotating in unison therewith in a balanced position relative to the axis of rotation of the rotor, but free to change its position relative thereto, the momentum acquired by said roller weight causing the roller weight to travel upon the annular surface of the rotor in event of retardation of the rotation of the latter until the center of gravity of the weight is shifted out of balanced relation with the center of rotation of the rotor and gravity influence will cause further movement of the rotor.

3. An alternating current synchronous motor including a field magnet, and a rotor subjected to successive magnetic impulses of the field magnet, and a weight annulus suspended in eccentric relation upon a concentric portion of the rotor and normally rotating in unison therewith in a balanced position relative to the axis of rotation of the rotor but free to change its position relative thereto, the momentum acquired by said weight annulus during such rotation in balanced position being sufficient to cause a shifting movement of the eccentric annulus relative to the rotor upon retardation of the latter, whereby an actuating impulse is imparted to the rotor supplemental to its magnetic impulses.

4. An alternating current synchronous motor including a field magnet, and a rotor subjected to successive magnetic impulses of the field magnet, and an inertia weight normally carried by the rotor in a balanced relation with the center of rotation but free to shift relative thereto, the momentum acquired by said weight while in balanced relation being sufficient to effect a relative shifting movement thereof to an unbalanced relation upon retardation of the motor whereby an actuating impulse is transmitted to the rotor.

5. An alternating current synchronous motor including a field magnet, and a rotor subjected to successive magnetic impulses of the field magnet, and an inertia weight eccentrically positioned relative to the axis of rotation and free for movement relative to the rotor in the plane of rotation thereof, the weight being normally held by gravity in a balanced relation with the axis of oscillation and movable therefrom by inertia upon retardation of the rotor whereby the weight assumes an unbalanced relation to the axis of rotation of the rotor whereupon gravity influence will effect a movement of the rotor.

6. An alternating current synchronous motor including a field magnet, and a rotor subjected to successive magnetic impulses of the field magnet, and a gravity weight carried by the rotor in normally balanced relation with the axis of oscillation and moved therefrom by inertia upon retardation of the rotation of the rotor, the unbalanced condition of the rotor created by the relative shifting of the weight effecting a tilting movement of the rotor under influence of gravity sufficient to advance the rotor into the field of influence of the succeeding magnetic impulse.

7. An alternating current synchronous motor including a field magnet and a rotor associated therewith and actuated by magnetic impulses imparted by said magnet, a roller weight loosely associated in eccentric relation with the rotor and having rolling contact upon a concentric surface of the rotor, means for manually rotating the rotor, which motion is transmitted to the roller weight by the traction contact between said members, the inertia of said roller weight being sufficient to effect driving actuation of the rotor after manual actuation thereof has ceased.

8. An alternating current synchronous motor including a field magnet and a rotor associated therewith and actuated by magnetic impulses imparted by said magnet, a roller weight loosely positioned therein in eccentric relation with the rotor and having rolling contact engagement with the interior peripheral wall of the rotor, said weight normally rotating freely in unison with the rotor in a balanced position relative to the axis of rotation of the rotor and adapted to roll upon the interior wall of the rotor out of such balanced position upon retardation of the rotor to effect a momentary unbalanced condition of the rotor sufficient to move the rotor under influence of gravity into position to receive the next magnetic impulse.

9. An alternating current synchronous motor including a field magnet and a rotor associated therewith and actuated by magnetic impulses imparted by said magnet, said rotor including a concentric hub, an annulus weight surrounding the hub and suspended thereon in eccentric relation with the rotor, said hub having rolling contact upon the interior circumference of the annulus weight, said weight normally rotating freely in unison with the rotor in balanced position relative to the axis of rotation of the rotor, and adapted to oscillate upon said hub out of such balanced position upon retardation of the rotor to effect a momentary unbalanced condition of the rotor sufficient to move the rotor into position to receive the next magnetic impulse.

10. A synchronous actuating motor including a field magnet, a rotor, an inertia weight normally occupying a balanced relation with the rotor and normally traveling in unison therewith, the retardation of the rotor causing a relative shifting of the center of gravity of the weight out of balanced relation with the rotor, which unbalanced condition will impart an actuating impulse to the rotor.

11. An alternating current synchronous motor including a field magnet and a rotor subjected to successive actuating magnetic impulses, and a weight element carried by the rotor and assuming an unbalanced relation relative thereto intermediate successive magnetic impulses to impart to the rotor additional actuating impulses.

12. An alternating current synchronous motor including a field magnet and a rotor subjected to successive actuating magnetic impulses, and an automatic gravity pendulum adapted to impart to the rotor an additional impulse variable with the speed of rotation of the rotor.

13. A synchronous motor having a rotor, and an inertia element operatively associated therewith adapted to momentarily shift its center of gravity about a horizontal axis intermediate succeeding electrical impulses to which the rotor is subjected to transmit to the rotor an overbalancing impulse sufficient to advance the rotor to position to receive the succeeding electrical impulse.

14. A synchronous actuating motor including a rotor, an eccentrically positioned inertia member having rolling contact with the rotor, adapted upon retardation of the rotor to shift its center of gravity relative to the center of rotation of the rotor sufficiently to overbalance the rotor and thereby impart an actuating impulse thereto.

15. A synchronous actuating motor including a rotor, and an associated inertia member having a tendency to move relatively in a direction reversely to that of the rotor, said inertia member being operatively connected with the rotor whereby the relative reverse movement of the inertia member wil impart a forward impulse to the rotor.

16. The combination with a rotary member subject to successive actuating impulses, of a circular weight element carried thereby in a shifting and eccentric relation to which rotary motion is transmitted from the rotary member, said weight and rotary member being subject to shifting relation upon change of speed of rotation of the rotary member whereby said weight imparts to the rotary member an additional actuating impulse.

17. The combination with a rotary member subject to successive actuating impulses, of a relatively movable circular weight carried thereby to which rotary motion is transmitted from the said rotary member which due to differential rotary motion assumes unbalanced relation relative to the rotary member intermediate successive actuating impulses thereof thereby imparting additional actuating impulses thereto.

18. The combination with a rotary element subject to successive actuating impulses, of a relatively movable rotary inertia member associated therewith and receiving rotary motion therefrom adapted to momentarily shift its center of gravity relative to the rotary element intermediate succeeding impulses thereby subjecting the rotary element to an overbalancing influence by which further rotary action is imparted thereto.

19. The combination with a rotary member subject to successive rotary impulses, an eccentrically positioned inertia member having rolling contact with the rotary member and adapted upon retardation of the rotor to shift its center of gravity relative to the center of rotation of the rotary member sufficiently to overbalance the latter and thereby impart an actuating impulse thereto.

20. The combination with a rotary member subject to successive rotary impulses, and a relatively movable weight member associated therewith and controlled by fluctuations of speed of the rotary member by which the weight is caused to assume varying degrees of overbalancing relation thereto to impart thereto an auxiliary actuating influence.

21. The combination with a rotary member subject to successive actuating impulses, of an annulus weight suspended upon the rotary member in eccentric relation therewith and having rolling contact therewith by which rotary motion is transmitted from the rotary member to the annulus, the continued momentum of the rolling annulus being sufficient to carry the latter into unbalanced relation to the rotary member upon retardation of the latter to impart thereto an auxiliary rotary influence.

22. The combination with a rotary member subject to successive actuating impulses, a relatively movable inertia weight normally occupying a balanced relation to the rotary member and normally traveling in unison therewith, the momentum of the weight effecting a relative shifting of the center of gravity of the weight out of balanced relation with the rotary member to thereby impart thereto an auxiliary rotary influence.

23. The combination with a rotary member subject to successive actuatng impulses, a roller weight having free rolling contact therewith and receiving rotary motion therefrom, said weight normally assuming a balanced relation to the rotary member during unison rotation of the members and adapted to roll therefrom into unbalanced relation therewith upon retardation of the rotary member to impart thereto an auxiliary rotary influence.

24. The combination with a rotary member subject to successive actuating impulses and having a concentric traction surface, a roller weight rolling upon the interior of the traction surface and receiving rotary motion therefrom, said weight tending to assume a balanced relation to the axis of rotation of the rotary member, its momentum carrying it therefrom into unbalanced relation with the rotary member upon retardation of the latter to impart an auxiliary rotary influence thereto.

EVERETT P. LARSH.
EMIL J. PETERHANS.